Patented Mar. 29, 1932

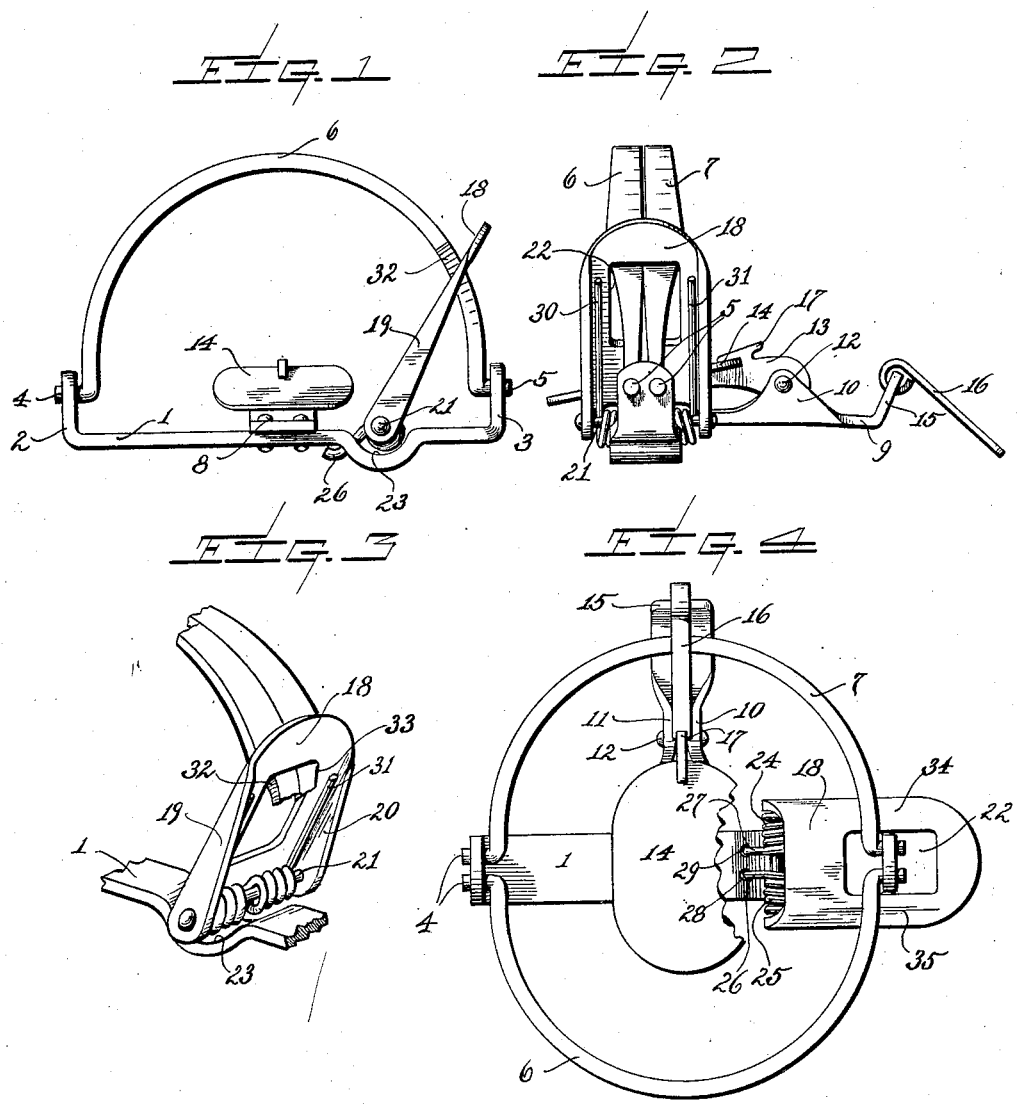

1,851,096

UNITED STATES PATENT OFFICE

HOLDRIDGE G. GREENE, OF ONEIDA, NEW YORK, ASSIGNOR TO NORWICH WIRE WORKS, INC., OF NORWICH, NEW YORK, A CORPORATION OF NEW YORK

GAME TRAP

Application filed June 28, 1921. Serial No. 481,052.

This invention relates to game traps, and more particularly to that type of trap wherein a pair of opposed jaws are pivotally mounted upon a foundation or base plate, and are actuated by spring means operating upon both of the said jaws.

One of the objects of the invention is to provide new and improved means for actuating said jaws, whereby the usual bowed spring hitherto commonly employed to perform this function is eliminated.

Another object of the invention is to simplify the construction of a trap of the above character, and provide the trap with a greater setting range, while at the same time providing jaw actuating means, which is more durable and less likely to become inoperative or ineffective under the severe weather conditions to which traps are necessarily subjected.

A further object of the invention is to provide new and improved means for locking the jaws in closed position when they have been actuated to grip the leg or other portion of the anatomy of an animal.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings, wherein I have illustrated a preferred form of embodiment of my invention:

Figure 1 is a side elevational view of my improved trap with the jaws in closed position.

Figure 2 is an end elevational view thereof, with the jaws also in closed position.

Figure 3 is a view in perspective, showing the actuating means for the trap jaws; and Figure 4 is a plan view partly broken away of my improved trap, showing the same in "set" position.

Referring now to the drawings, wherein similar reference characters refer to similar parts throughout the several views thereof, the reference numeral 1 denotes the foundation or base plate, which base plate has upstanding ends 2 and 3, the latter being apertured to receive the pintles 4 and 5 of the opposed jaws 6 and 7. The jaws are of usual form, and are adapted to swing to open and closed position, as is common in this type of trap.

Fastened to the base plate, as by means of rivets 8, is a cross-arm 9, the latter extending outwardly at right angles to the base plate, and having the turned up flanges 10 and 11, between which extends, and to which is pivoted at 12, the shank 13 of the bait pan 14.

The end portion of the cross-arm 9 is also turned upwardly at 15, said latter part being apertured so as to form a pivotal mounting for the dog or trigger 16, which latter element co-operates with a catch or shoulder 17 formed upon the shank 13 of the bait pan to hold the trap in "set" condition, in a way that is also common to this form of traps.

It will be understood, of course, that when the dog 16 is engaged with the catch 17 with the jaw 7, underneath said dog, the jaws are held in open position against the stress exerted by the actuating means.

Reference numeral 18 designates what I have termed the "actuating member" for the trap jaws, the latter comprising a strip of metal having downwardly turned side flanges 19 and 20, the latter being apertured to receive the ends of a rod 21, which rod forms the pivotal support for the actuating member.

The actuating member is provided with an aperture 22, which receives one end of each of the jaws 6 and 7, and which aperture is also of sufficient width to receive the upstanding end 3 of the base plate 1, when the trap is in "set" condition, as illustrated in Figure 4 of the drawings.

Located in a depression 23, formed in the base plate 1, are coil springs 24 and 25, said springs being coiled about the rod 21. The ends 26 and 27 of the coil springs 24 and 25 extend through apertures 28 and 29 formed in the base plate 1. The opposite ends 30 and 31 extend upwardly along the rear face of the actuating member 18, said coil springs being under such an initial tension as will cause them to constantly urge the actuating member to an upward swinging movement, which movement is limited by shoulders 32 and 33 formed upon the jaws 6 and 7.

The side flanges 19 and 20 of the actuating member 18 serve to prevent lateral displacement of the ends 30 and 31 of the coil springs 24 and 25 respectively, whereby they are maintained in operative positions and prevented from moving from behind said actuating member 18.

From the description just given, it will be observed that the coil springs 24 and 25 perform the double function of providing a pivotal support for the actuating member 18, and of forming the operating means for the said actuating member 18, whereby the jaws of the trap are forcibly closed together when the trap is sprung by a depression of the bait pan.

When the trap is in "set" condition the fast jaw 7 of the trap engages with the strip of metal 34, which forms one wall of the aperture 22, the other or free jaw 6 resting upon the strip of metal 35, which forms the wall of the opposite side of said aperture. The end 36 of the actuating member, which is preferably rounded as shown, forms a convenient finger piece to be engaged by the thumb or fingers of the operator when depressing said actuating member to "set" the trap.

A defect in traps of this character that existed before the invention of Albert E. Kinsley, patented August 28th, 1917, No. 1,238,525 is also cured by the present invention. This defect was that owing to the stress put upon one side of the bow of the usual U-shaped spring employed to actuate the jaws of the trap, the tilting or twisting of the bow of the spring under the stress of being held under restraint by said locked jaw, would cause the opposite side of the bow of the spring to cam or lift up the free jaw, to such an extent as to impair the efficiency of the trap.

It will be noted that the aperture 22 of the actuating member 18 is of just sufficient width to give a nice clearance between the lateral walls of said aperture, and the upwardly turned end or leg 3 of the base plate 1. Therefore, should there be any tendency of the actuating member to be twisted or turned in a sideward direction, by reason of the restraint imposed upon the locked jaw by the detent or dog 16 when the trap is in "set" condition, any such twisting or tilting of said actuating member is prevented by the engagement of the lateral walls of said aperture 22 with the edges of the said upstanding end 3 of the base plate 1.

It will accordingly be seen that I have provided a construction well adapted to attain, among others, all the ends and objects above pointed out, in an extremely facile manner. The provision of the coil springs employed in the manner disclosed herein, not only insures a longer life for the trap, but eliminates a serious objection heretofore inherent in this type of trap, which objection is the extreme difficulty of securing an even or uniform temper of the U-shaped spring heretofore most commonly used in this type of trap.

It is a well known mechanical fact that coil springs, such as employed herein, can be evenly tempered, and that such springs are of greater durability than the aforesaid U-shaped spring.

Moreover, inasmuch as the cumbersome U-shaped spring is absent from the trap embodying the present invention, the trap can be "set" in a greater variety of advantageous positions than can the trap equipped with the objectionable U-shaped spring.

Moreover, it will be obvious that the trap will not be rendered inoperative should one of the coil springs break, or become otherwise ineffective, since an upward swinging movement of the actuating member will be caused by the operation of a single spring. The actuating member when engaged with the shoulders of the jaws also forms a positive means for locking the jaws in their closed positions.

As many changes could be made in this construction without departing from the scope of the following claims, it is intended that all matter contained in the above description or shown in the accompanying drawings shall be interpreted as illustrative only and not in a limiting sense.

Having thus described my invention what I claim as new and desire to secure by Letters Patent is:

1. In a game trap, in combination, a base plate having a pair of jaws mounted thereon, an actuating member through which said jaws extend located intermediate the ends of said jaws, said actuating member when swung toward the base plate, permitting the jaws to open, and when swung away from the base plate, operating to close said jaws, means engaging one of said jaws, adapted to cause the latter to hold said actuating member in its depressed position, and spring means interposed between the base plate and the actuating member, adapted to exert a constant stress toward swinging the actuating member away from said base plate, said spring means also providing a pivotal support for said actuating member.

2. In a game trap, the combination of a base plate, a pair of jaws pivotally mounted therein, an actuating member having an aperture through which said jaws extend, a pin mounted on said actuating member, a pair of coiled springs mounted on said base plate intermediate the ends of said jaws, one end of each spring being anchored in said base plate, the coils encircling said pin, and the opposite end bearing against said actuating member, whereby to support said actuating member and to tend to force it upwardly to close said jaws.

3. In a game trap, the combination of a base plate, having upstanding ends, a pair of jaws pivotally supported in said ends, an actuating member provided with an aperture through which said jaws extend, and having opposed depending flanges, a pin mounted between said flanges, and a pair of coiled springs mounted in said base intermediate its ends, and encircling said pin whereby to support and operate said actuating member.

4. In a game trap, the combination of a base plate, a pair of jaws pivotally supported thereon, an actuating member having an aperture through which said jaws extend, a pin mounted in said actuating member, and a pair of coiled springs mounted in said base intermediate the ends of said jaws and encircling said pin whereby to support said actuating member.

5. In a game trap, in combination, a pair of jaws pivotally mounted thereon, an actuating member located intermediate the ends of said jaws, and having an aperture through which said jaws extend, and a pair of coil springs bearing against the actuating member to cause it to tend to close said jaws, the coils of said springs serving as a pivotal support for said actuating member.

6. The combination in a game trap, of a base plate, a pair of jaws pivotally mounted therein, an actuating member having an aperture through which said jaws extend, said actuating member being located intermediate the ends of said jaws and provided with a pivot pin, a pair of coil springs located in said base and adapted to exert pressure on said actuating member to cause it to close said jaws, the coils of said spring forming a housing and bearing for said pivot pin.

7. In a game trap, the combination with a base plate and jaws pivotally mounted thereon, of an actuating member comprising a plate having an aperture through which said jaws extend, and a coil spring under tension having one of its ends extending through and anchored in said base plate, and its opposite end engaging the actuating member, said coil spring forming a pivotal support for said actuating member.

8. In a game trap, the combination with a base plate having upstanding ears at its end portion, and a depression located intermediate said ears, jaws pivotally mounted in said ears, of an actuating member comprising a plate provided with an aperture through which said jaws extend, and a coil spring located in the depression of said base plate, having one of its ends extending through said base plate and anchored therein, and the other of its ends engaging said actuating member.

In testimony whereof, I affix my signature.

HOLDRIDGE G. GREENE.